US007640169B2

(12) United States Patent
Horton

(10) Patent No.: US 7,640,169 B2
(45) Date of Patent: Dec. 29, 2009

(54) SYSTEMS AND METHODS FOR PROVIDING A DIGITAL IMAGE AND DISPOSITION OF A GOOD DAMAGED DURING TRANSIT

(75) Inventor: Mark Horton, Suwanne, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 802 days.

(21) Appl. No.: 11/015,049

(22) Filed: Dec. 17, 2004

(65) Prior Publication Data
US 2006/0136236 A1 Jun. 22, 2006

(51) Int. Cl.
*G06Q 10/00* (2006.01)
(52) U.S. Cl. .......................................................... 705/1
(58) Field of Classification Search ...................... 705/4, 705/22, 28; 235/469
See application file for complete search history.

(56) References Cited

U.S. PATENT DOCUMENTS

| 5,758,329 | A | 5/1998 | Wojcik et al. |
| 5,770,841 | A | 6/1998 | Moed et al. |
| 5,922,040 | A | 7/1999 | Prabhakaran |
| 6,323,782 | B1* | 11/2001 | Stephens et al. ......... 340/10.31 |
| 6,539,360 | B1* | 3/2003 | Kadaba ....................... 705/28 |
| 2002/0082853 | A1* | 6/2002 | Goodwin ...................... 705/1 |
| 2002/0120475 | A1* | 8/2002 | Morimoto ...................... 705/4 |
| 2004/0155110 | A1* | 8/2004 | Ehrhart et al. .............. 235/469 |
| 2005/0004877 | A1* | 1/2005 | McLellan et al. ........... 705/400 |
| 2005/0038682 | A1 | 2/2005 | Gandee et al. |
| 2005/0216294 | A1 | 9/2005 | Labow |
| 2005/0289008 | A1* | 12/2005 | Olivier et al. ................. 705/22 |

OTHER PUBLICATIONS

"Philippines—Portal Plans to Boost E-Shopping", Newsbyte News Networkm Oct. 6, 2000.*
"Who's shipping your hazmats?", Hoffman, Stanley, Distribution, Dec. 1995, p. 66.*
International Search Report from PCT/US2005/43558, dated Jul. 10, 2006.

\* cited by examiner

*Primary Examiner*—John W Hayes
*Assistant Examiner*—Rob Wu
(74) *Attorney, Agent, or Firm*—Alston & Bird LLP

(57) ABSTRACT

Systems and methods are disclosed for determining the disposition of a shipped good, such as a car, damaged during transit. After the damage is detected, a digital image of the is obtained. The image is uploaded to a server typically along with the vehicle identification number and/or other identification data. The server determines the appropriate individual(s) to be contacted, and generates a notification message, typically including the URL of a web site where further information can be obtained. The appropriate individual ("user") logs onto the server to view the digital images and provides input regarding the disposition of the good. The user may direct the damaged car to a repair shop, a dealer, or another destination. Alternatively, the user may indicate delivery of the car as originally planned. The server may notify other systems of the disposition as well. Other embodiments apply to the disposition of delivered packages.

8 Claims, 5 Drawing Sheets

SYSTEMS AND METHODS FOR PROVIDING A DIGITAL IMAGE AND DISPOSITION OF A GOOD DAMAGED DURING TRANSIT

FIELD OF THE INVENTION

The present invention relates generally to systems and methods for handling goods that are damaged during transit. Specifically, systems and methods are defined for obtaining a digital image of a good damaged during transit, such as an automobile, in which the appropriate interested parties are notified and are able to view a digital image stored in a digital image server of the damaged good, and provide an indication of whether the damaged good should be redirected to another destination.

BACKGROUND OF THE INVENTION

The distribution of goods from the point of manufacture to the ultimate destination typically involves various common carriers and intermittent storage/mixing facilities. These facilities are where goods are temporarily stored and transloaded for shipment to the next destination of their route. In other instances, goods may be typically packaged at the factory and loaded onto common carriers where the goods are shipped to distribution centers. The goods are off-loaded, temporarily stored, and then at a subsequent point in time, reloaded onto another common carrier for shipping to the final destination. Many goods, particularly if they are imported, typically encounter further instances of storage and transshipment at ports of entry.

It is not usual during the course of shipping and handling for goods to become damaged in some form, such as being dented, dropped or crushed. For many household goods, individual unit packaging or aggregate packaging is designed, in part, to protect the goods against limited damage. Further, in many instances, there are existing procedures in placed defining how the damages goods should be processed. For example, in many instances depending on the terms of shipment, the consignee accepts delivery of the damaged goods, but retains a right to make a claim.

However, many other types of goods are shipped without protective packaging because the nature of the good does not render it practical or economically feasible to package the goods. For example, industrial goods are often affixed to wooden pallets or contained within a wooden crate to facilitate handling, but these structures are not typically designed to protect the goods. Other goods (such as automobiles) are inherently mobile and are shipped without being affixed to any special structures. In some cases, automobiles may receive a protective plastic coating to protect against the vehicle against the elements. Nevertheless, the goods are susceptible to damage.

For some products (such as industrial machines) minor cosmetic damage incurred during transit does not impact the consignee's acceptance of the delivery of the article. However, significant damage may impact the acceptance of the delivery of the article, such as requiring it be returned to the factory or redirected to designated repair location. For other products, such as automobiles, even minor cosmetic damage may render the car unacceptable for delivery to the consumer. Given the ubiquitous nature of automobile repair businesses in conjunction with the cost of shipping automobiles, damaged automobiles are not typically returned to the manufacturer, but are redirected to an automobile repair shop. However, the disposition of the damaged good depends in part on the nature of the damage incurred. Thus, existing default procedures for handing damage to these types of goods cannot cover all the various possibilities in an easily, clearly defined, and efficient manner.

In the instance of a car damages during transit, various entities may be involved in determining the disposition of the good. These entities can include the manufacturer, the operator of a distribution or 'mixing' facility, one or more common carriers (e.g., the vehicle transporter that may be in the form of a truck hauler, rail car hauler, or other), an automobile dealer, and the customer (purchaser) of the car. Based on where the damage occurs, the responsible entity, the extent of the damage, as well as other factors, various parties may be involved in determining the disposition of the car.

For example, minor weather damage (e.g., hail damage) to a car during delivery to an automobile dealer may not warrant diversion of the car to an auto body repair shop. However, more significant damage (e.g., a tree branch falling onto an automobile, or the auto transporter involved in an accident) may warrant diversion of the automobile to a repair shop. Further, there may be certain auto body repair businesses that are preferred by the manufacturer, insurance provider, hauler, or dealer. Still further, more serious types of accidents (e.g., fire damage or rollover damage) may warrant diversion of the automobile to a salvage yard. Thus, there are a variety of types of damage that may occur to the good being shipped, a variety of entities that may require notification or input as to where the good should be diverted, if at all, and a variety of parties that require notification of the disposition of the good.

Thus, there is a need for systems and methods for facilitating the notification of damage to a good during transit, receiving input from the appropriate party regarding rerouting of the good, and rerouting of the good.

SUMMARY OF THE INVENTION

In one embodiment, a system coordinates the disposition of a good damaged during transit comprising a server receiving input including an identifier associated with the damaged good and digital image data representing the damaged good, the server adapted to use the identifier to retrieve related data regarding the good, the server further adapted to generate a notification message to a user associated with the damaged good, the server further adapted to receive a request for the digital image data from the user and present at least a portion of the digital image data to the user, and receive a response from the user regarding the disposition of the delivery of the good. The system further comprises a database operatively connected to the processor, adapted to store the digital image data representing the shipped good, the related data regarding the good, and the response from the user regarding the disposition of the delivery of the good.

In another embodiment of the invention, a method is provided that determines the disposition of a good damaged during transit comprising receiving at a server digital image data of a good damaged during transit, receiving at the server identification data associated with the good, storing the digital image data and the identification data in a database operatively connected to the server, determining notification data associated with the identification data wherein the notification data comprises an address of a user, using the address to generate a notification message to the user, receiving a request from the user for at least a portion of the digital image data of the good, presenting at least a portion of the digital image data on a web site to the user, receiving an indication from the user impacting the delivery of the good, and storing the indication from the user in the database in association with the identification data.

These are but a few embodiments of the invention and other embodiments may pertain to delivery of packages, instead of automobiles. This summary is not intended to limit the invention as defined by the claims in any way.

BRIEF DESCRIPTION OF THE DRAWINGS

Having thus described the invention in general terms, reference will now be made to the accompanying drawings, which are not necessarily drawn to scale.

Figure 1:
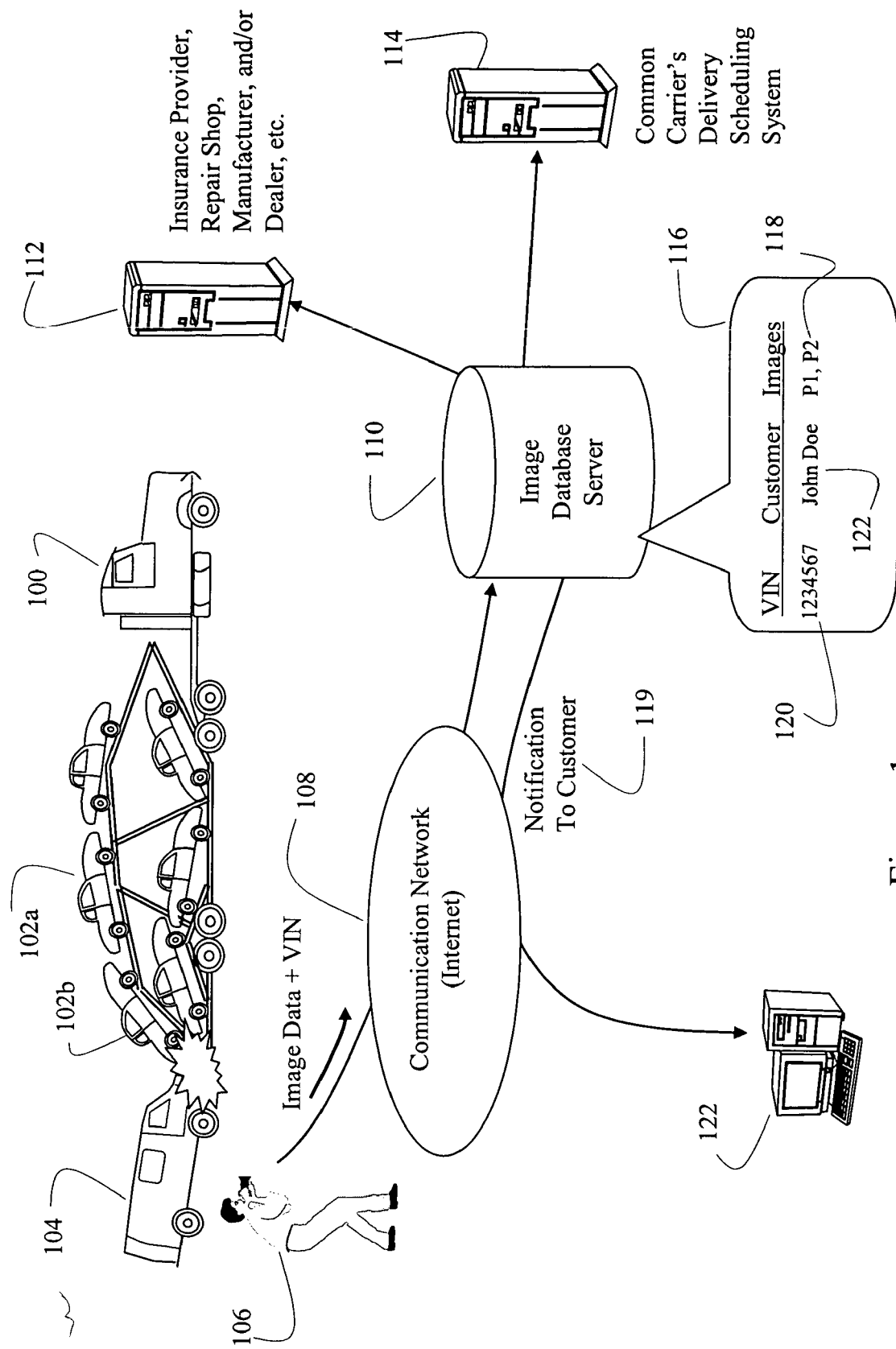

FIG. 1 depicts one embodiment of various elements and processes that may be involved according to principles of the present invention.

Figure 2A:
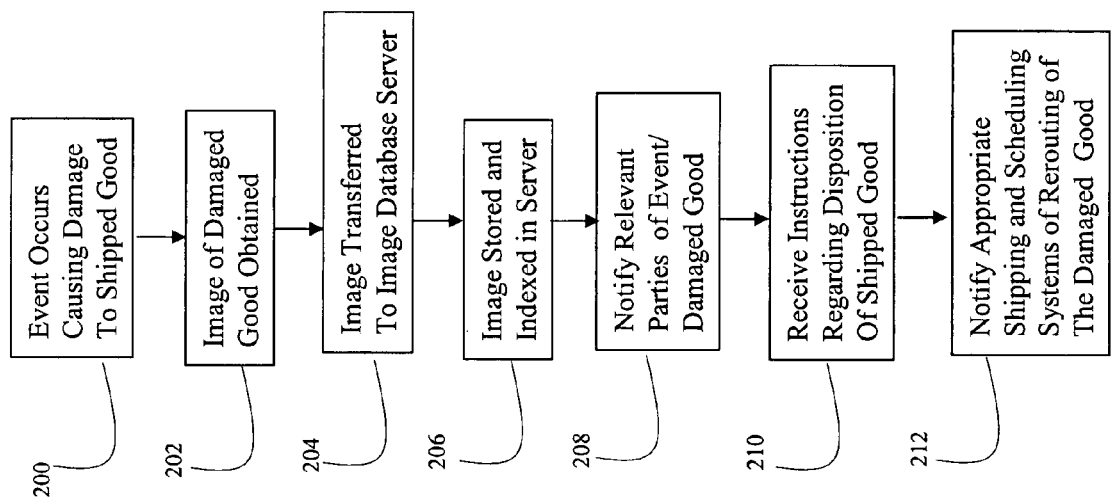
Figure 2B:
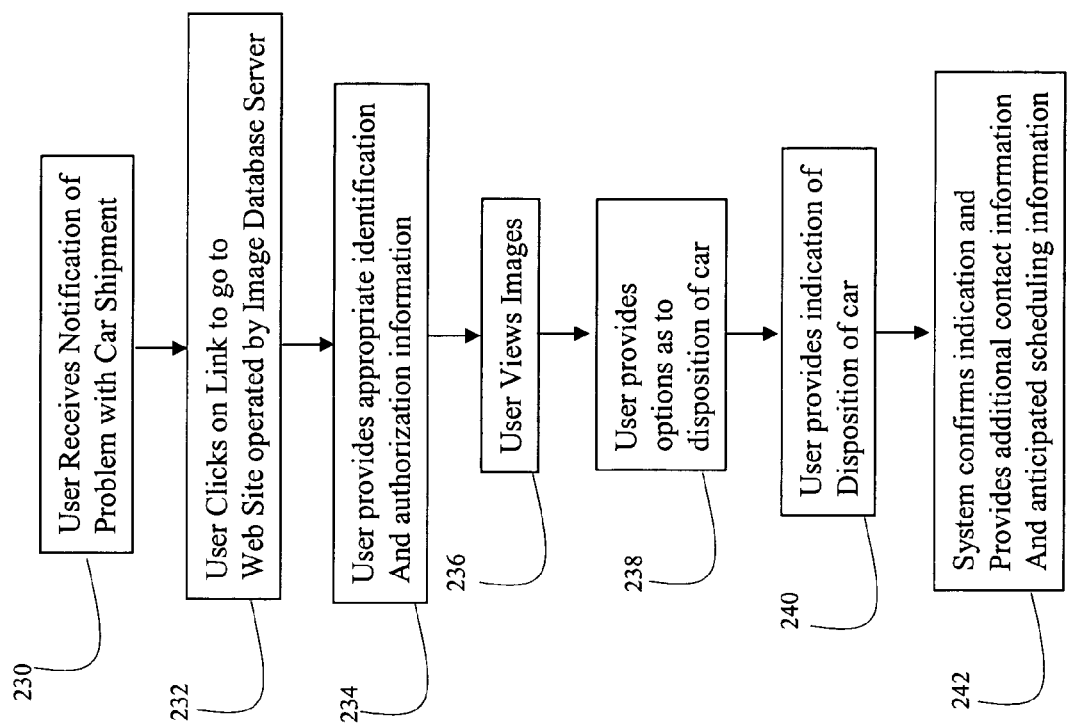

FIGS. 2a and 2b depict an embodiment of the steps involved according to the principles of the present invention.

Figure 3:
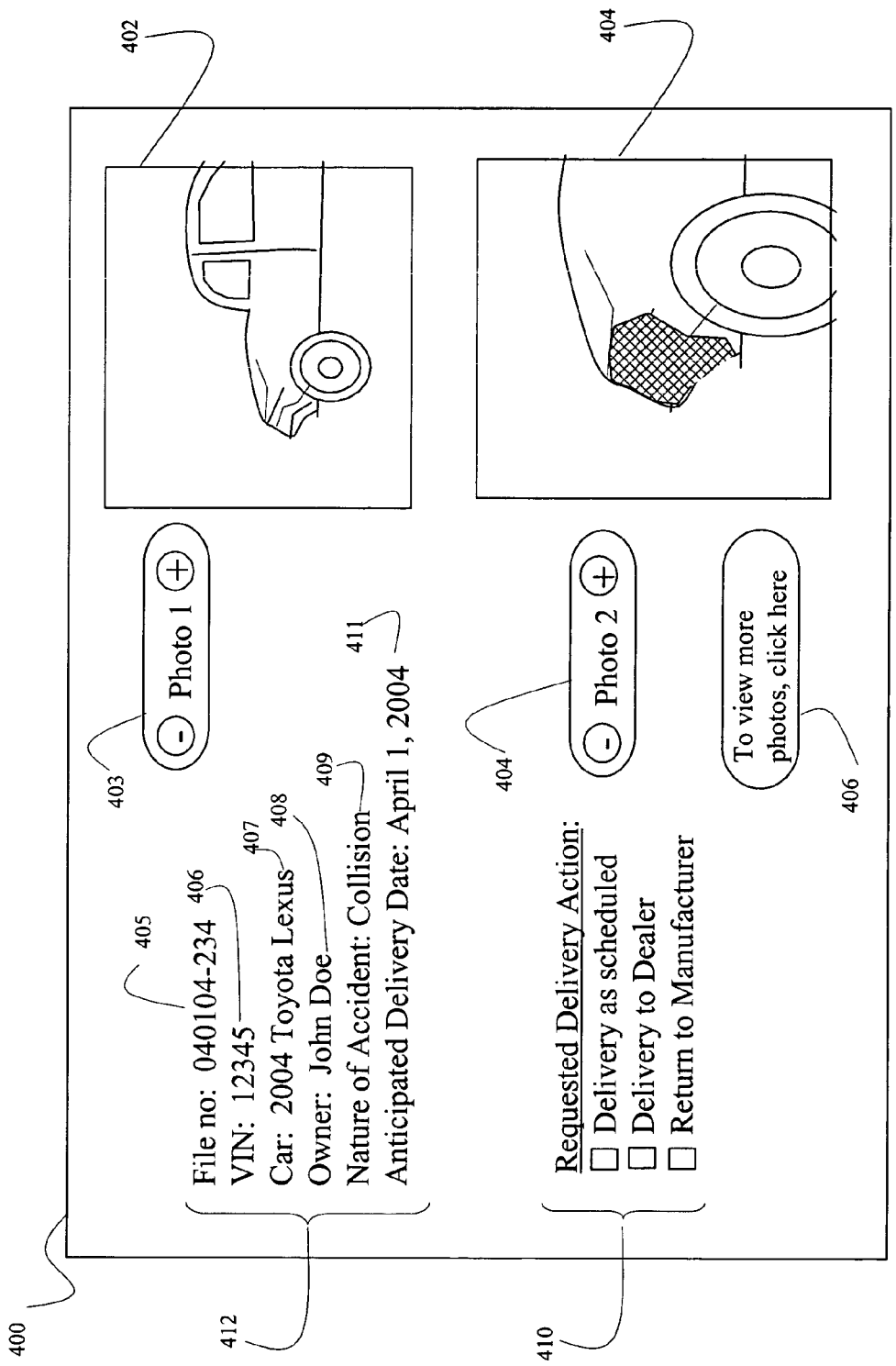

FIG. 3 depicts one embodiment of a web-based screen image provided to a user according to the principles of the present invention.

Figure 4:
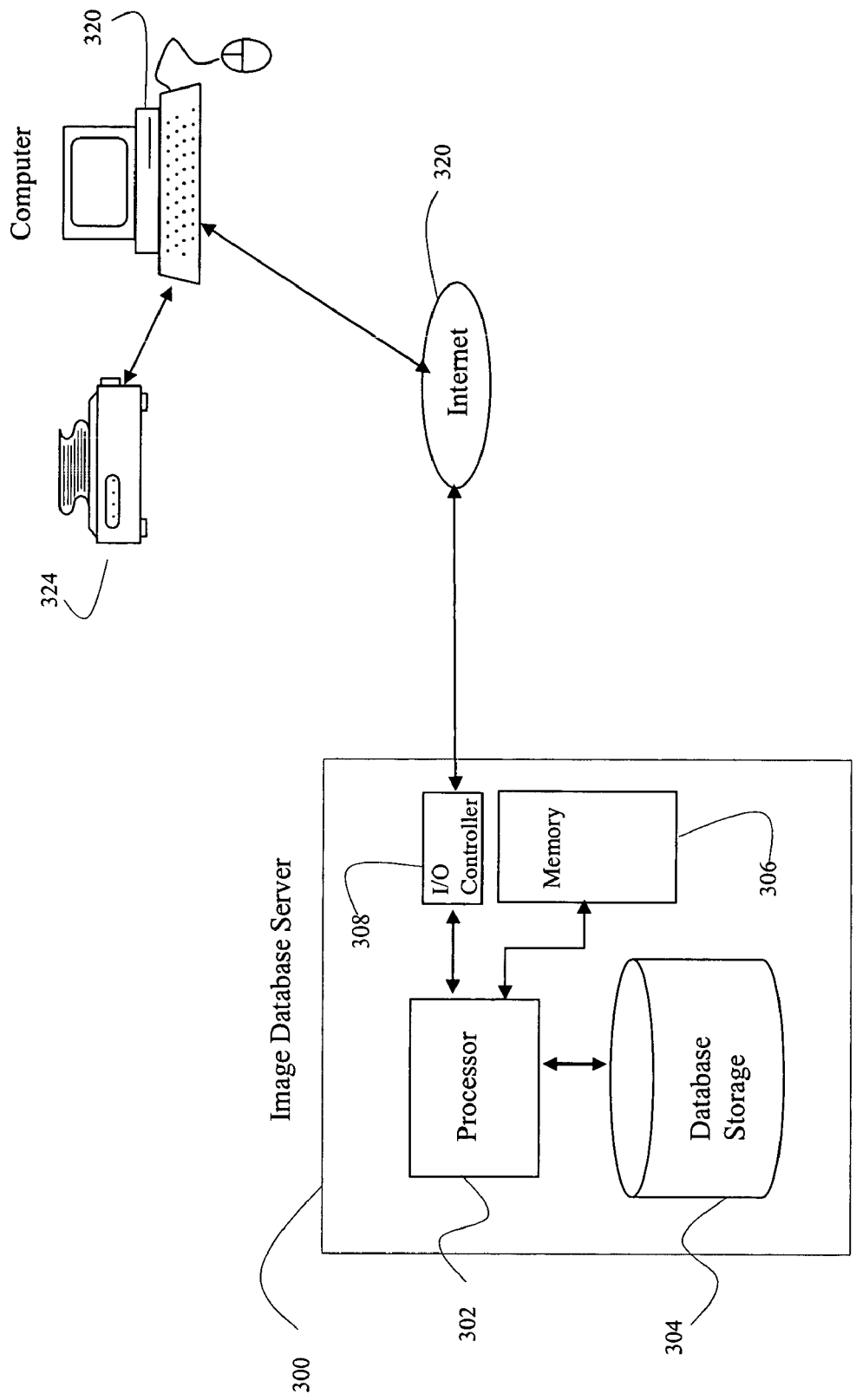

FIG. 4 depicts one embodiment of the system elements that may be involved according to the principles of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Although the present invention is illustrated in terms of the shipment of an automobile from the manufacturer to the end destination, the principles of the present invention apply to many other types of goods and shipping processes. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

During the transport of goods, various types of damage may occur to the good. In most instances, the common carrier delivers the goods as normal and any claims for damages are pursued by the recipient or shipper as is well known in the art. Often times, items damaged during transit may require repair at a location other than their indicated delivery location. While the damaged goods could be delivered to the indicated delivery location, doing so would only require the damaged goods to be shipped again to the appropriate repair location, thus increasing the overall shipping costs. One object of the present invention is to provide for system and methods of redirecting the damaged good during transit to minimize overall shipping costs. Although the principles of the present invention are illustrated in terms of shipping a vehicle, the principles of the present invention can apply to other goods and other scenarios in which goods are damaged during transit. For example, the goods could be a package and the digital image could be used as evidence of delivery of the good in a non-damaged condition. In addition, the digital image could be accompanied by a 'time-stamp' (e.g., information regarding the date and time the image was obtained, as well as a 'location-stamp' (e.g., GPS coordinates indicating the location where the image was obtained). The images can be readily retrieved by a user using a computer connected to the Internet.

FIG. 1 illustrates one embodiment of the elements involved in a typical application of the system. A common carrier of vehicles 100 (also known as a "car hauler"), is transporting a group of cars 102 from an origination point to a destination point. The origination point may be the manufacturer's factory, a 'mixing station' where vehicles from the factory are regrouped for delivery, a port of entry, or some other location. The destination may be a dealer, a mixing station, or an import/export port, or some other location.

During the course of delivery of the cars, damage to one of the cars 102b occurs. This is illustrated as a collision involving another vehicle 104. The type and nature of the damage can vary from cosmetic to structural, and may be caused by collisions, falling tools, shifting loads, road debris, or any variety of causes.

As soon as the damage is detected, the driver 106 of the car hauler uses a digital camera to take an image of the damaged car. The digital image may be taken by another individual, for example, a field supervisor, insurance agent, or some other individual that is instructed to take a picture of the damaged car. Typically, it is an employee or agent of the entity in possession of the good at that point in delivery. The image is typically taken using a digital camera, which is readily available and typically provides JPEG formatted digital image files.

However, other devices incorporating digital image capturing technology may be used, other than a dedicated digital cameras. For example, many mobile phones now have digital cameras built into the phone, and these can be used as well. Other devices, such as the Delivery Information Acquisition Device (DIAD) described in U.S. patent application No. 20030114206, filed Aug. 23, 2002, and entitled "Portable Data Acquisition And Management System And Associated Device And Method" could be used as they too, can incorporate a digital imaging capture device. The DIAD incorporates a number of functional other capabilities, including a GPS location determination unit and various wireless and wireline communication capabilities.

The digital image of the damaged car is uploaded via a communications network 108 which is typically the Internet. In other embodiments, the digital image capturing device may incorporate wireless communication capabilities for transferring the image. Associated with the digital image is typically information identifying at least the car associated, so that the image can be correlated with the car. The identification typically is the Vehicle Identification Number (VIN) that is a unique and readily locatable number on the vehicle. Alternatively, or in addition, other identifying information may be included, such as car type, color, destination, owner's name, purchase order number, shipment number, etc.

Although not detailed, any of the various software applications for transferring and uploading digital images can be used. For example, most digital cameras allow uploading of digital image files to a personal computer via a USB interface and the appropriate cable, and in turn, the personal computer can upload the images to a web site over the Internet. Alternatively, many mobile phones now incorporate a digital camera and utilize the wireless communication capability of the mobile phone for transferring the image files. Further, many mobile phones allow wireless access to web-based applications, allowing the driver to enter the VIN and other identifying information. Thus, there are a variety of existing technologies that can be used to readily transfer a digital image at the location where the damage occurred. Further, there are a variety of methods for associating the image with an identifier, including the name of the image file, linking the name of the image file with another file containing the identifier, etc.

If the aforementioned DIAD is used to capture images, the images can be transmitted to a host based on the wireless communication capabilities incorporated into the DIAD that are disclosed in the aforementioned patent application. Alternatively, the DIAD may store the images locally in one of the various types of memory incorporated into the DIAD. Since the DIAD is returned to a docking station by delivery personnel and after the completion of a day's work, the digital images can then be transmitted as a batch file using wireline transmission capabilities incorporated into the docking units.

The image file and identification data is sent to an image database server 110 ("server") that stores and indexes the image based on the identification data. Typically, a plurality of images of the same damaged car are sent to the database depicting the damage from different perspectives.

The server 110 receiving and storing the digital images typically also stores various related files, such as data files associated with the purchase/ordering or shipping of the good, consumer of the good, manufacturing information, etc. The server may comprise a processor interacting with a database that is local or remote, and the processor may have various interfaces to communicate in order to receive digital images, provide digital images, etc. Thus, "database server" and "image server" are equivalent to the "server." In other embodiments, the database may be remote to the processor, or closely coupled. Either embodiment is within the scope of the present invention.

The server may store other related files, and one such related file 116 is illustrated that associates the VIN 120 with the related prospective or current car owner's name ("customer" name) 122, contact information (not shown), along with the appropriate pointers 118 to the appropriate digital images stored elsewhere in the database. Those skilled in the art of databases architecture will recognize that a variety of files; data structures; and indexing, linking, and pointing techniques; as well as database software management systems may be used. Further, the file structure of FIG. 1 is but only one embodiment of numerous alternatives that may embody the principles of the present invention.

The server 110 is typically also capable of notifying and interacting with other individuals and/or computer systems. Typically, upon receipt of an indication of damage to a car (which may be via receipt of images, or of some other indication), the server 110 provides an indication to at least one other system, such as a shipping scheduling system typically associated with the common carrier 114. This system typically tracks the status of shipments, and the notification to this system allows the tracking and scheduling system to be aware that an anomaly has occurred impacting delivery of the shipment. Other notifications may be sent to other systems associated with an insurance provider or an intended intermediate recipient 112 such as a scheduling system for a mixing station or a dealer system processing incoming shipments.

The image database 110 also maintains (or is able to access) contact information for the customer or other relevant individuals (not shown). The contact information also indicates (potentially) various communication means that can be used in order of preference to contact the relevant individuals. The contact information is typically in the form of an email address, URL, facsimile number, or telephone number. If an email address is provided, then an automatic email notification message is sent requesting that the customer log onto a specified web site. Alternatively, if only a telephone number is provided, the database system 110 may notify a system administrator or other support person that, in turn, telephones the relevant individual. Other alternatives include sending messages using short message service (SMS) to a cell phone, instant messaging (IM) over the Internet, facsimile transmission, automatic letter generation to a postal address, or other forms of electronic communication.

In the embodiment of FIG. 1, the image database 110 sends an email message 119 to the customer's computer 122, although the email could be sent to a PDA, mobile phone, pager, or other device capable of receiving an electronic message. In other embodiments, a paper-based notification or automated phone call can be generated. Typically, the customer receives a message notifying them that a problem has occurred with the shipment of their car and the message provides a web-based hyperlink to receive further details. The notification message may include reference information used by the recipient to identify the particular transaction and further information for the reader to use to obtain further information.

FIG. 2a recaps the main steps. In step 200, the process begins by the occurrence of an event causing damage to the good (car) being transported. In step 202, an image of the damaged good is obtained by an individual typically associated with the carrier, such as the driver of the delivery vehicle. In step 204 the image is transferred to the database server and in step 206 the image is indexed and associated with the appropriate information, which may include, but is not limited to, customer information including contact address. In step 208 the database notifies the appropriate parties of the occurrence of the event, which typically at least includes notifying the customer or the consignee (if they are not the same). In step 210, the database server receives instructions from the user regarding the disposition of the damaged car. Typically, this occurs via the customer interacting with a web site. Finally in step 212, the database server notifies any other appropriate systems of how the damaged good should be redirected. This may include notifying the intended new recipient (e.g. repair shop), updating various scheduling and delivery systems (e.g. assigning and scheduling a new car hauler), and notifying an insurance company (e.g., indicating who will repair the vehicle).

In FIG. 2b, various steps are illustrated associated from the perspective of the customer (e.g., purchaser of the car). In step 230, the process typically begins with the customer (e.g., "user" of the system) receiving notification in some manner of a problem associated with the car shipment. As previous indicated, the notification may be an email, telephone call, or other form of notification. Typically, the result is that the user in step 232 accesses a web site operated by the image database server. In alternative embodiments such as when the customer does not have Internet access, the customer may interact by talking with a customer service agent who has access to the server via the Internet, who then enters information at a terminal or computer to access the server.

In step 234 the user logs onto the server and provides appropriate identification and authorization information. The identification and authorization of the user could be based on various types of information, such as the user's name, but could also be based on the VIN, shipping number, or other identification data. In step 236 the user is presented images of the damaged car. In step 238 the user is provided various options as to the potential delivery options associated with the damaged car, including redirecting it to a repair shop, a local dealer, or perhaps rejecting any acceptance of the vehicle. In step 240, the user provides an indication of their preferred disposition of the damaged car, including other alternatives. Finally, in step 242, the system accepts the user's indication, and confirms the data provided. The server typically then provides additional information to the user regarding the disposition of the damaged car, including anticipated updated scheduling data, delivery location and contact information to determine the future status of the car. The information provided to the user typically depends on the input provided by the user as to how the car should be handled.

One embodiment of the user interface is provided in FIG. 3. In FIG. 3, the screen shot 400 typically provides several images (photos) of the damaged car. Typically one photo 402 shows an overview of the damage while another photo 404 shows a different perspective or angle of the damage to the car. In some embodiments, the user may activate a control button 403, 404 for zooming or panning a particular photo. Other control buttons 406 may provide the user with the ability to view additional photos.

The web page may also provide other information to the user. For example, the embodiment of FIG. 3 illustrates text information 412 that server currently maintains or has obtained regarding the event. In FIG. 3, one data illustrated is depicted as a file number 405 that references the overall event, including all image data, response data (such as the VIN 406,) and other related data (e.g., the type of car 407, the name of the owner 408, facts surrounding the damage 409, and information regarding new potential delivery date 411).

The web page also provides an opportunity for the user to provide input as to the desired disposition of the vehicle. In this embodiment, input options 410 are presented allowing the user to select an option as to where or how the damaged car should be routed.

The information provided by the server, as well as the screen layout, functionality, and operation of the web site are subject to various embodiments. Those skilled in the art of web-design will readily appreciate the various methods, design, and capabilities that can be programmed to facilitate user-friendly interaction in a variety of ways.

Finally, FIG. 4 illustrates one embodiment of the image database server. Turning to FIG. 4, the server 300 comprises a processor 302 accessing a database storage device 304 storing the images. The processor further interacts with main memory 306 and an I/O controller 308 allowing communication over the Internet 320 with the user's computer 320. In some embodiment, the processor may use a communications network to access the date remotely from the database storage device 304. The user's computer may also have a local printer 324 for printing out the images of the damaged car.

The server 300 may be one of a variety of brands or types of computers, from a personal computer to a large multi-processor Internet server. Further, the server may execute one of various types of operating systems and software for performing the indicated functions as is known to those skilled in the art of the Internet. Typically, the user's computer 320 is a personal computer using a readily available version of an Internet browser for interacting with the server 300. Various architectures and embodiments for the server are possible, and all are intended to be within the scope of the principles of the present invention.

Alternative Embodiments

The preceding illustrates the principles of the invention with respect to delivery of an automobile that has been damaged. However, the principles of the present invention apply to other scenarios and a few of these embodiments are discussed below.

Although obtaining a digital image of the delivery of an automobile is one embodiment, the digital image can be associated with delivery of other types of items and/or performance of a tasks. For example, the digital image could be that of a package being delivered. The image could serve as proof of delivery of the package (e.g., performance of a task). Further, the image could verify the condition of the item delivered; namely that it was not damaged. Further, the image could provide evidence that the package was left at a certain location, which could be accomplished by obtaining an image in the context of the desired location (e.g., taking a picture of the package left at a residence, where the residence is included in the image).

In other contexts, the image could serve as proof of completion of a task. For example, a service technician or personnel dispatched to perform some action (e.g., replacing a broken window) could obtain proof of completion of the task by capturing an image of the result (e.g., a replace window). While the image by itself may not be conclusive of completion of a task, recordation of the time and location, when stored along with the image, may provide a sufficient evidentiary indication.

For example, the aforementioned DIAD device incorporates a digital camera, a real-time clock, and a GPS location unit. Thus, when the DIAD obtains a digital image of the delivery of the package when it is delivered, the DIAD could obtain a current value of the time and GPS coordinates. This information (e.g., 'time-stamp' and 'location-stamp') would be recorded with the image file, or would be recorded as a separate file that is linked to the image file. Thus, proof of completion of the task (delivery of a package), along with the condition of the package (image of the package), along with the time (via the time-stamp), and the location (via GPS coordinates), provide an evidentiary record of the delivery of an intact parcel at a given location and at a certain time.

As previously indicated, the image data (along with the associated time and location data) could be transmitted individually using the wireless communication capabilities of the DIAD, or could be stored within the DIAD for downloading at the end of the work day, when the personnel and the DIAD have returned to the dispatch center. At that point, the DIAD is returned to a docking station and wireline communication can be used.

Once the server obtains and store image data for the packages (along with other information such as location, time, and tracking number information), the information could be easily searched and retrieved using any of the aforementioned information, particularly the tracking number. Thus, a user expecting a delivery of a package at a remote location could be electronically notified of the delivery, and the notification could provide image and time data, or provide the user with a link or other information that is used to retrieve the image data. Thus, by using the tracking number, a recipient of a package, while located at a working location, could visually verify delivery of a package to their residence. For example, a server may send digital files to a defined recipient as an email attachment for direct viewing, or pass a URL with an index allowing the user to link to an indicated web site. Such proof of delivery can be important in verifying the disposition of an item being delivered. This is particularly useful for the carrier or shipper in dealing with claims by the consignee.

When a user retrieves images from the server regarding a particular shipment (as normally indexed by a tracking number provider by a user), the system could not only provide the image data to the user, which is displayed on the user's computer, but also the tracking number, location coordinates, and/or date and time when the image was obtained. These additional related data are associated by the server with the image information. This encompasses implementations in which the location and time/date data is stored separate from the image data and linked thereto, or stored within each image data file. The image data file (and potentially the location and time/date data) is then indexed via a tracking number, package number, RFID identifier, or other type of identifier that can be used to index the images.

It should be emphasized that the above-described embodiments of the present invention are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that those skilled in the art will observe that many variations and modifications can be made to the disclosed embodiments without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

I claim:

1. A method for providing the disposition of a good that is being transported by a carrier and that has been damaged during transit to an intended delivery location, said method comprising:
   receiving, at a server, digital image data of the damaged good wherein the digital image data of the damaged good is provided by the carrier while the carrier is transporting the damaged good, but prior to attempting delivery of the damaged good to the intended delivery location;
   receiving, at the server, identification data associated with the damaged good;
   storing the digital image data in association with the identification data in a database operatively connected to the server;
   retrieving notification data associated with the identification data, wherein the notification data comprises an electronic message address of a user;
   using the electronic message address to generate a notification message to the user;
   receiving an electronic request at the server transmitted from the user over a communication network requesting the digital image data of the damaged good;
   transmitting at least a portion of the digital image data from the server to the user;
   receiving, at the server prior to said carrier attempting delivery of the damaged good to said intended delivery location, an electronic message transmitted by the user, wherein the electronic message provides an indication from the user regarding the disposition of the delivery of the damaged good, said indication having been made by said user after said user has had the opportunity to view the portion of the digital image data;
   storing the indication from the user in the database in association with the identification data; and
   in response to the indication indicating that the intended recipient wishes to receive the damaged item despite the damage to the item, delivering the damaged item to the intended recipient; and
   in response to the indication indicating that the intended recipient does not wish to receive the damaged item despite the damage to said item, not delivering the damaged item to the intended recipient.

2. The method of claim 1 wherein the identification data associated with the damaged good comprises a vehicle identification number.

3. The method of claim 1 wherein the notification message generated to the user is in the form of an email message and comprises an address for a web site.

4. The method of claim 1 wherein the step of receiving the digital image data associated with the damaged good comprises receiving the digital image data with date data and GPS location data.

5. The method of claim 1 further comprising:
   receiving first identification data and first authorization information from the user; and
   determining if the first identification data and first authorization information respectively match second identification data and second authorization information.

6. The method of claim 1 wherein presenting at least a portion of the digital image data on a web site to the user comprises transmitting a JPEG data file over the Internet to a client browser executing on a personal computer.

7. The method of claim 1 further comprising transmitting the indication provided by the user from the server to a shipping resource scheduling system.

8. The method of claim 1 further comprising using a portable computing device having an integrated digital camera for producing the digital image data, the portable computing device capable of wirelessly transmitting the digital image.

* * * * *

UNITED STATES PATENT AND TRADEMARK OFFICE
CERTIFICATE OF CORRECTION

PATENT NO. : 7,640,169 B2  Page 1 of 1
APPLICATION NO. : 11/015049
DATED : December 29, 2009
INVENTOR(S) : Mark Horton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Ninth Day of November, 2010

David J. Kappos
*Director of the United States Patent and Trademark Office*